April 20, 1937.  R. J. BELL  2,077,980
COFFEE DISPENSER
Filed May 21, 1935  2 Sheets-Sheet 1

Robert J. Bell, INVENTOR
BY Victor J. Evans & Co.
ATTORNEY

April 20, 1937.   R. J. BELL   2,077,980
COFFEE DISPENSER
Filed May 21, 1935   2 Sheets-Sheet 2
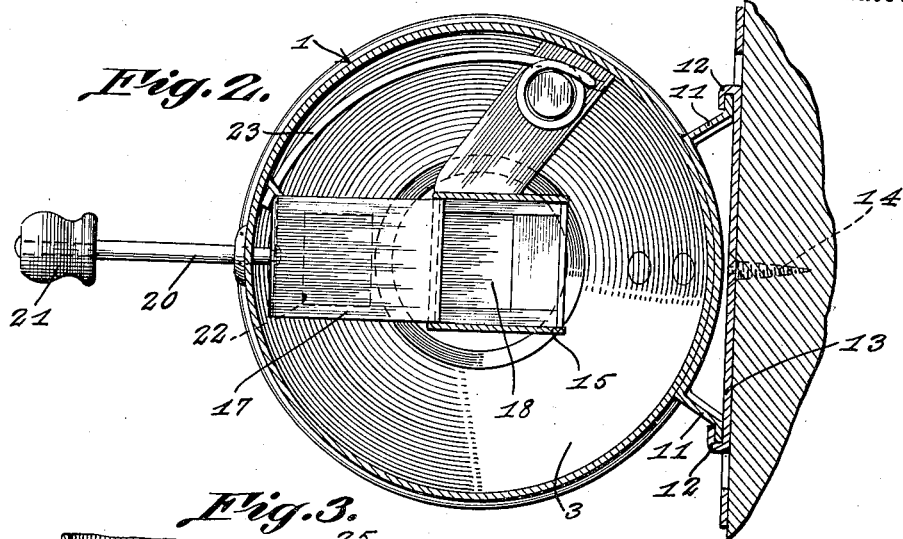
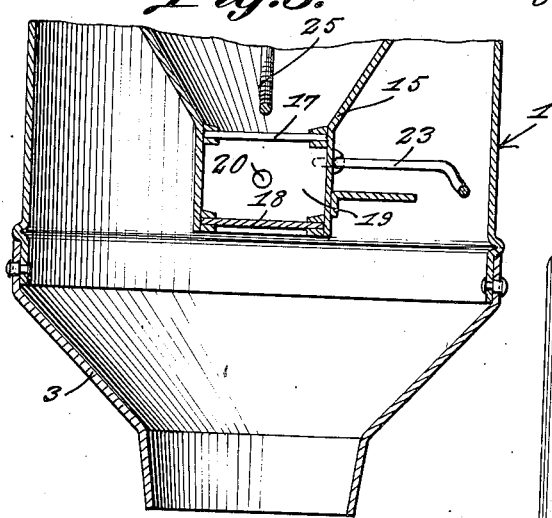
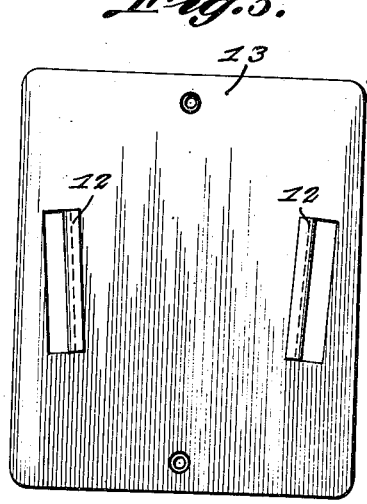
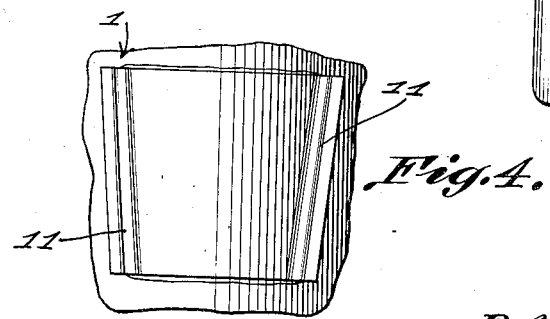
Robert J. Bell, INVENTOR
BY Victor J. Evans & Co.
ATTORNEY Patented Apr. 20, 1937

2,077,980

UNITED STATES PATENT OFFICE 2,077,980

COFFEE DISPENSER

Robert J. Bell, Orlando, Fla.

Application May 21, 1935, Serial No. 22,628

1 Claim. (Cl. 83—18)

This invention relates to a dispenser employed for dispensing food ingredients and is especially adapted for dispensing coffee and provides a convenient, sanitary and easily operated household device in which coffee may be placed when removed from an ordinary coffee container, and has for the primary object the provision of a device of this character whereby each operation thereof will dispense a measured or predetermined amount of coffee, so that the dispensed coffee will be in an amount to assure proper making of a determined number of cups of brewed coffee.

Another object of the invention is the provision of a grinding mechanism forming a part of the dispensing mechanism, whereby unground coffee may be ground as needed and then dispensed in predetermined amounts.

Figure 2 is a sectional view taken on the line 2—2 of Figure 1.

Figure 3 is a sectional view taken on the line 3—3 of Figure 1.

Figure 4 is a fragmentary plan view showing attaching ears for cooperation with an attaching bracket in securing the device to a wall or like support.

Figure 5 is a plan view showing the attaching plate.

Figure 1:
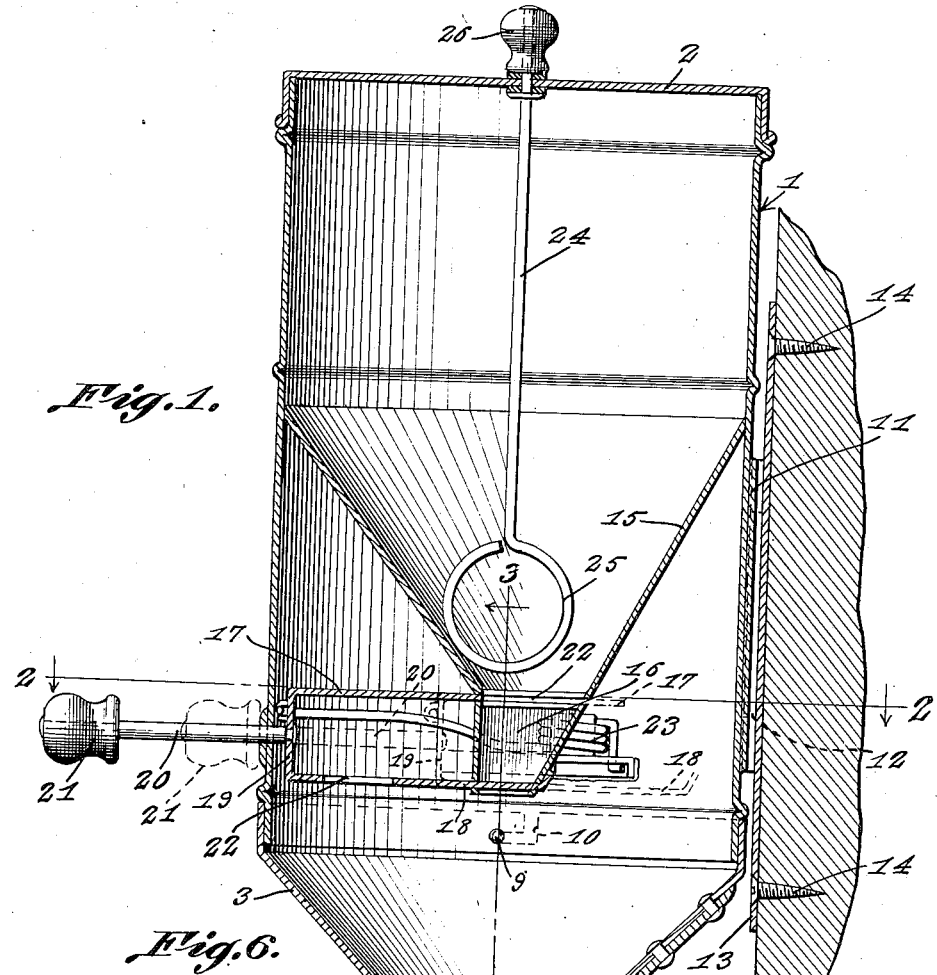
Figure 1 is a vertical sectional view illustrating a dispensing device constructed in accordance with my invention.

Referring in detail to the drawings, the numeral 1 indicates a container having its upper end closed by a removable cover 2 while the lower end has removably secured thereto a discharge neck 3 carrying a spring arm 4 terminating in a finger piece 5. Located adjacent the finger piece 5 and forming an integral part of the spring arm is a shoulder or rest 6 adapted to engage under a receiving container 7 for supporting the latter with the discharge neck extending therein, as shown in Figure 1. The receiving container 7 may be constructed of glass or any other material suitable for the purpose and has graduations thereon, as shown at 8. It is preferable that the graduations 8 be arranged to indicate teaspoonful amounts. The discharge neck 3 is detachably secured to the container 1 by pins 9 operating in bayonet slots 10.

Formed on the wall of the container 1 are vertically arranged diverging attaching flanges 11 adapted to slide into converging guides 12 formed on an attaching plate 13, the latter being apertured to receive fasteners 14 for securing the plate to a wall or like support. The container 1 thus mounted to a wall or like support can be readily removed by an upward sliding movement.

Formed in the container 1 is a hopper wall 15 terminating into a measuring chamber 16. The bottom of the measuring chamber 16 is fully open and disposed directly over the discharge neck 3. The measuring chamber 16 is provided with upper and lower slots to slidably receive upper and lower gates 17 and 18 integrally connected by an end wall 19 to which a rod 20 is secured. The rod 20 slides through an opening in the container 1 and is equipped at its outer end with a finger piece 21. The gates 17 and 18 are provided with slots 22, the slots being disposed laterally of each other. A suitable spring mechanism 23 is connected to the end wall 19 of the gates for the purpose of normally positioning the gates so that the hopper will be in direct communication with the measuring chamber and the bottom of the latter closed to the discharge neck 3.

An agitator rod 24 is journaled to the cover 2 and has one end bent to form an agitator head 25 operating within the hopper while the outer end of the rod 24 is equipped with a finger piece 26 whereby the agitator head 25 may be rotated for stirring ingredients into the hopper so as to pass readily into the measuring chamber 16.

The device shown in the drawings and heretofore described in detail may be employed for dispensing various kinds of food products or ingredients. However, it is especially adaptable for dispensing coffee, the container being of a capacity to receive the entire amount of coffee sold in an ordinary coffee container and with the cover applied the coffee will be, to a great extent, protected against loss of its aroma and also will prevent the coffee from coming in contact with foreign matter. The coffee placed in the container 1 immediately fills the measuring chamber and the latter's capacity is preferably of a teaspoonful amount so that on pushing the finger piece 21 inwardly the measured amount of coffee in the measuring container gravitates into the receiving receptacle 7 by way of the discharge neck 3 and at the same time closing the hopper to the measuring chamber. As soon as pressure is removed from the finger piece 21, the spring acts to restore the gates to their initial position or, in other words, opening the measuring chamber to the hopper to be again filled with coffee. Thus it will be seen that a person by the operation of the finger piece 21 can dispense desired amounts or measured amounts of coffee into the receiving receptacle 7. The coffee may then be removed from the receiving receptacle 7 and placed in a coffee pot for brewing. It is only necessary to flex the spring arm 4 in order to disengage the shoulder 6 from the bottom of the container 7 which will permit a person to readily slip the container from the discharge neck 3. The reapplication of the container 7 to the discharge neck is extremely simple. To reposition the container 7 the latter is moved upwardly to bring the discharge member into said container and the shoulder 6 snaps under the bottom of said container.

The device being easily detached from its support will permit a person after opening an ordinary coffee can or container to place the container 1 in an inverted position over said ordinary coffee can or container and then replacing the container 1 on the support, still having the ordinary coffee container or can in the container 1, will prevent any danger of wasting or spilling the coffee when the transfer is made from the ordinary container to the container 1. However, this operation is not necessary as the container 1 may be filled with coffee by simply pouring the coffee therein after the removal of the cover 2.

Figure 6:
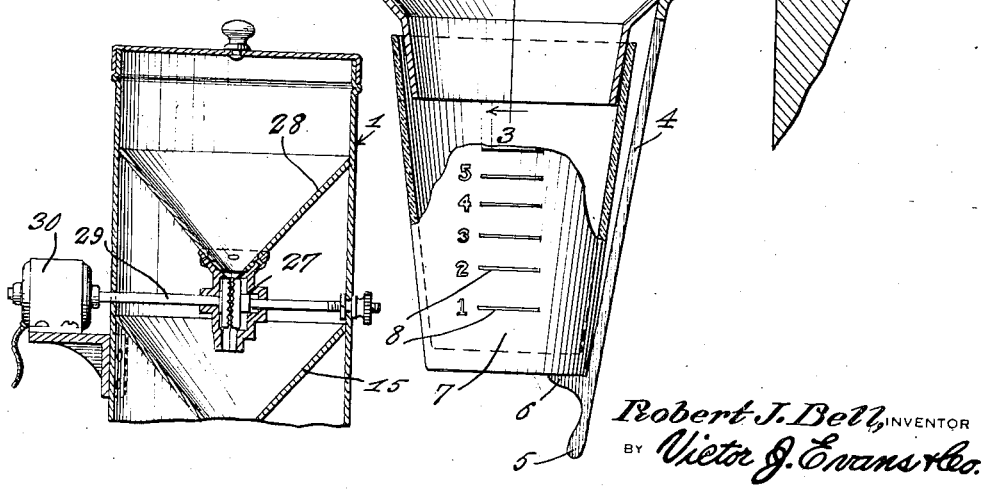
Figure 6 is a fragmentary vertical sectional view showing a modified form of my invention.

Referring to my modified form of invention, arranged in the container 1 above the hopper 15 is a grinding mechanism 27 of any conventional construction, a portion of which is in hopper formation, as shown in Figure 6. The operating shaft of the grinding mechanism is indicated at 29 and projects outwardly of the container 1 to which an operating medium is connected. This operating medium may be in the form of an electric motor 30 or a hand operating device. The purpose of the grinding mechanism 27 is for grinding unground coffee placed in the container 1 so that when ground it may pass to the measuring chamber 16, thereby providing in one unit a coffee grinder and dispensing device capable of dispensing the ground coffee in measured amounts.

The container 1 being detachable from the support and having the discharge neck and cover removable will permit the interior of the container and the measuring mechanism thereof to be readily washed or cleaned so that the device can be kept in a sanitary condition.

Having described the invention, I claim:

A device of the character described comprising a vertically arranged container open at each end, a collecting receptacle removably secured to said container for receiving coffee therefrom, an inverted conical-shaped portion located in and joined to said container to form in the upper portion of the latter a hopper for receiving coffee, said conical-shaped portion having spaced slots to form superimposed guides located adjacent the lower end thereof and having said last-mentioned end open, connected plates slidable in said guides and having slots arranged laterally of one another for admitting coffee to the space between said plates and permitting the coffee received in said space to pass to said receptacle in a measured amount after sliding movement of said plates into another position, means for sliding said plates, means connecting the lower end of the conical-shaped portion to the container, and a spring supported by said last means and secured to said plates for positioning the latter to close the open end of the conical-shaped portion.

ROBERT J. BELL.